J. P. WEIS.
TRIMMING MACHINE.
APPLICATION FILED SEPT. 1, 1911.
1,155,534.
Patented Oct. 5, 1915.
3 SHEETS—SHEET 2.
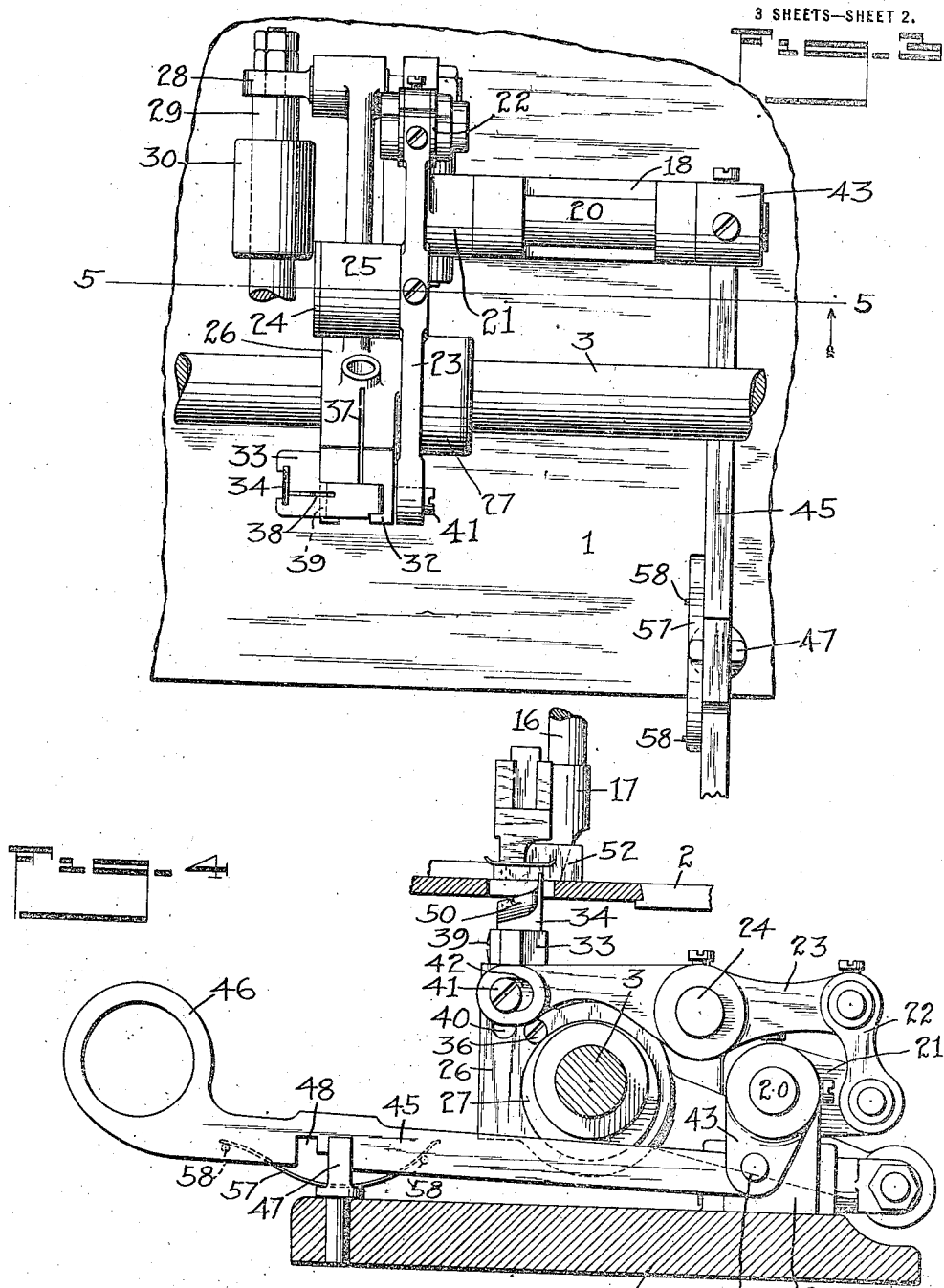
WITNESSES
INVENTOR:
John P. Weis,
BY
Chas. M. C. Chapman
ATTORNEY.

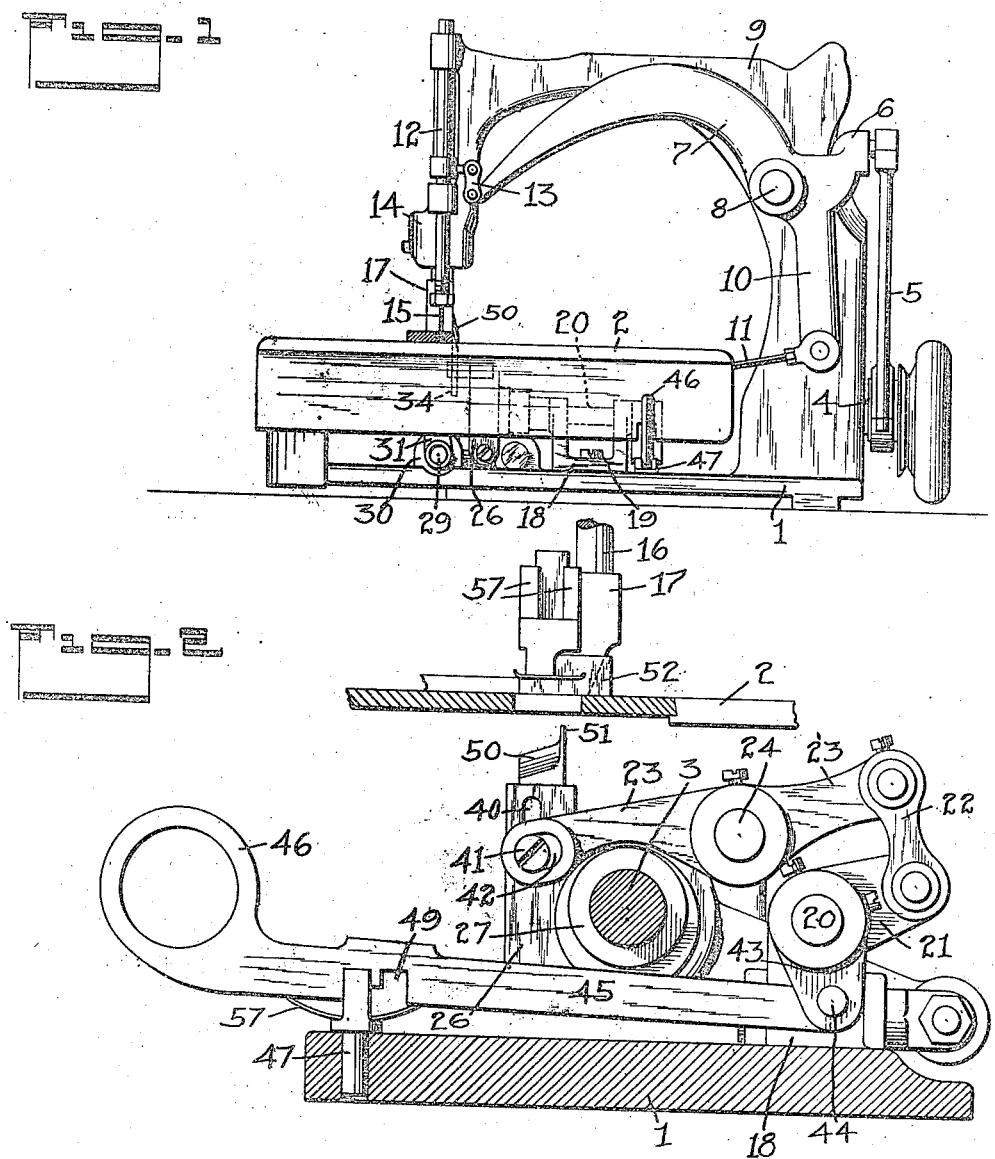

J. P. WEIS.
TRIMMING MACHINE.
APPLICATION FILED SEPT. 1, 1911.
1,155,534.
Patented Oct. 5, 1915.
3 SHEETS—SHEET 3.
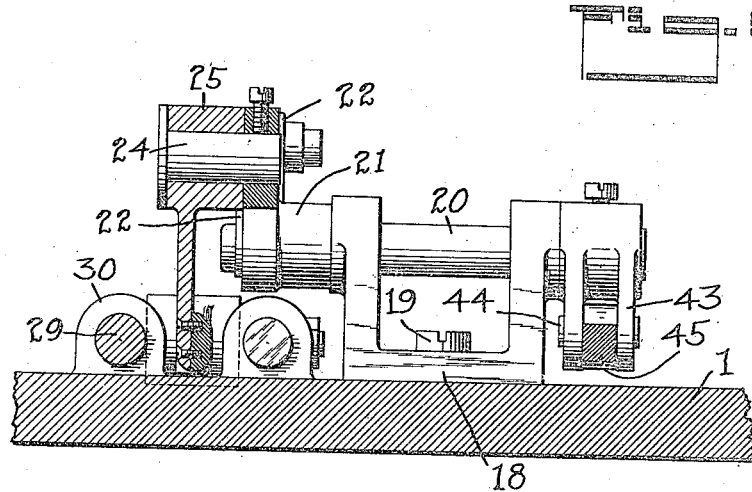
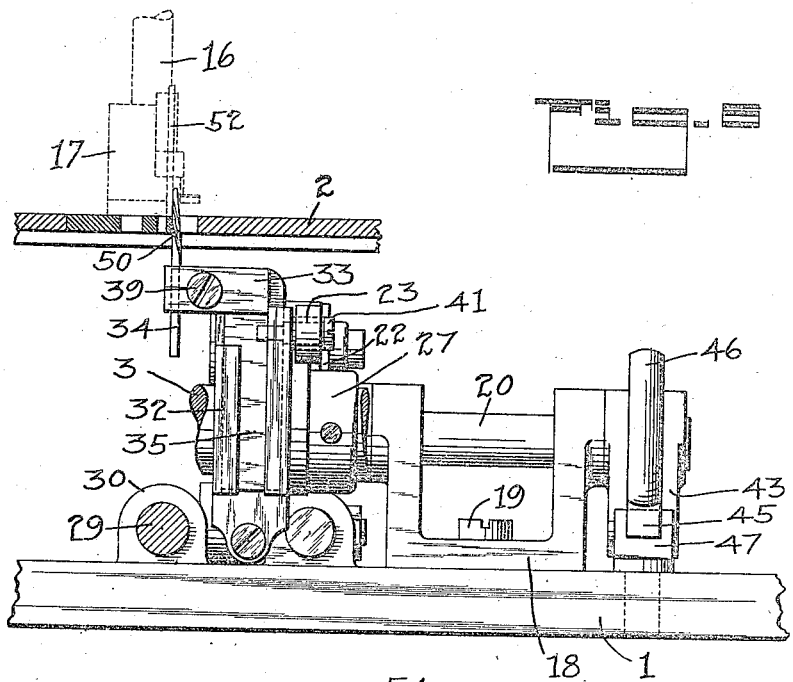
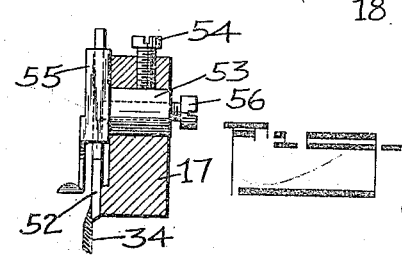
WITNESSES
INVENTOR:
John P. Weis,
BY
Chas. M. C. Chapman
ATTORNEY.

UNITED STATES PATENT OFFICE.

JOHN P. WEIS, OF NYACK, NEW YORK, ASSIGNOR, BY MESNE ASSIGNMENTS, TO METROPOLITAN SEWING MACHINE COMPANY, A CORPORATION OF NEW YORK.

TRIMMING-MACHINE.

1,155,534.  Specification of Letters Patent.  Patented Oct. 5, 1915.

Original application filed April 23, 1903, Serial No. 153,908. Divided and this application filed September 1, 1911. Serial No. 647,192.

*To all whom it may concern:*

Be it known that I, JOHN P. WEIS, a citizen of the United States, residing in Nyack, county of Rockland, and State of New York, have invented a new and useful Improvement in Trimming-Machines, of which the following is a description.

This invention relates to sewing machines and, particularly, to trimming mechanism which may be thrown into and out of operation at the will of the operator without stopping the machine and without affecting the operation of the stitching mechanism.

An object of my invention is to provide a trimming mechanism wherein the trimmer-blade may be shifted into and out of trimming position at the will of the operator without stopping the trimmer actuating means; to provide means whereby the trimmer may be depressed below the work-plate of the machine so as to remove the same for interference with the work when trimming is not desired; and to provide a trimming mechanism wherein the trimmer-blade is driven from or supported by some operating part of the machine so that while the blade may be thrown from action the supporting or actuating mechanism may continue in operation.

With the above objects in view and others which will be detailed during the course of this description, my invention consists in the parts, features, elements and combinations of elements, as hereinafter claimed.

In order that my invention may be fully understood, I have provided drawings wherein:

Figure 1 is a front elevation of a machine embodying my invention; Fig. 2 is an end elevation of my trimming mechanism with the driving-shaft, bed-plate and cloth-plate in section; Fig. 3 is a top plan view of the lower portion of Fig. 2, viz., those parts which are located below the cloth-plate; Fig. 4 is a view similar to Fig. 2 showing the parts in a different position of adjustment; Fig. 5 is a section taken substantially on the line 5—5 of Fig. 3; Fig. 6 is a front elevation of Fig. 4; and Fig. 7 is a detail in elevation and section of the ledger-blade and its supporting means.

As set forth in my patent granted Dec. 16, 1913, No. 1,087,797, of which this case is a division, the machine is constructed for the purpose of attaching a tape to certain portions of the body of a coat or like garment; that is to say, men's coats are ordinarily provided with a stiffening in the breast portions thereof, and to prevent the coat from sagging or wrinkling, and to preserve the curvature thereof along the front edge, it is necessary to apply a tape of heavy material to the stiffening so as to support the weight of the coat. And, in order to properly impart the requisite curvature and maintain the proper relation of the stiffening and coat-material, it is necessary to attach the tape under tension, or to "full" or to stretch the material of the coat upon the tape and stiffening. Heretofore, this operation has been done entirely by hand and has proven a tedious, lengthy and laborious operation. And certain portions of the garment, around its edges, have to be trimmed while other portions do not have to be trimmed; and, heretofore, it has been necessary, in passing from the portion to be trimmed to the portion not to be trimmed, to stop the machine and throw the cutter out of operation. Obviously, this is a great waste of time and involves a great expense.

By the machine illustrated and now to be described, the several objects above noted are fully secured and the operation and functions are accurately and properly performed.

Referring to the drawings, the numeral 1 is the bed-plate; 2 the cloth-plate; 3 the driving-shaft journaled between the two plates and carrying at its forward end, as is usual, any suitable means for actuating the looper and feeding mechanisms. The shaft also carries the eccentric 4 surrounded by the strap 5 at one end and connected at its upper end to an extension 6 of a needle-lever 7 journaled at 8 to the arm 9 of the machine and having its depending portion 10 pivotally connected to the looper-rod 11 all as usual. The needle-lever drives the needle-bar 12 by the link connection 13 said bar reciprocating in the head 14 of the machine, 15 being the needle held in said bar in usual manner. The presser-bar 16 has the foot-shank 17 connected thereto, the bar 16 operating in the head of the machine beside the needle-bar. The feed mechanism may be such as shown in my aforesaid application and the stitch-forming mechanism is of the chain-stitch variety.

Secured to the bed-plate 1, see particularly Figs. 3, 5 and 6, is an angular bracket 18, by means of a screw 19, the same affording a journal-bearing for the shaft 20, which at its forward end has secured thereto an arm 21, having connected thereto a link 22, the upper end of which is connected to the rear end of the lever 23 carrying a pin 24 journaled in a bearing 25 formed on or connected to an eccentric strap 26 surrounding an eccentric 27 carried near the forward end of the shaft 3. The rear end of the eccentric strap carries a pin or bolt 28 swiveling therein, said bolt being suitably connected to a shaft 29 passing through bearing 30 to the front of the machine at which point said shaft supports a looper-carrier 31 carrying a chain-stitch looper not shown but quite usual in these machines. It should be noted that the eccentric 27, strap 26 and shaft 29 are parts of the looper mechanism by which the looper is given its lateral vibration, or needle avoiding movement; and this looper mechanism constitutes the constantly moving part of the machine, when it is in operation, to which the trimmer has been connected for the purpose of my invention as stated. The forward end of the eccentric strap is enlarged and provided with an angular socket 32 for the reception of a holder 33 for the trimmer-blade 34, the holder being made angular, as shown in Fig. 6, and the vertical portion 35 being retained in the socket 32 by means of a clamping-screw 36 passing through the two parts of the forward end of the eccentric strap which is provided with a saw-cut as at 37 to provide the clamping action. This construction makes a clamp for retaining the trimmer-holder from lateral movement in the socket but permits it to have vertical movements therein. The trimmer-holder is also provided with a saw-cut 38 providing a clamp between the parts of which the blade 34 is held by means of a clamping-screw 39, the socket of the clamp being dove-tailed or grooved and the blade being correspondingly formed.

At one side the wall of the socket 32 is provided with an elongated slot 40 through which extends a screw 41 secured to the holder 32; and the forward end of the lever 23 is provided with an elongated slot 42 for engaging the screw 41. From this construction it will be seen that while the eccentric strap 26 is constantly operating or moving during the operation of the machine, thus imparting motion to the trimmer-holder and blade, still, by manipulating the lever 23 and depressing the forward end thereof, the trimmer-blade may be depressed below the cloth-plate 2 and out of operative position, the position of the lever 23 determining the position of the trimmer-blade 34.

To manipulate the lever 23 the shaft 20 is provided at its opposite end with a depending bifurcated-arm 43 between the parts of which is pivotally connected at 44, the hand-bar 45, provided with the manipulating ring or handle 46 at its forward end; and to hold the bar 45 in either of its extreme positions, i. e., to hold the trimmer-blade in or out of action, the bed-plate 1 is provided with a vertical post 47, the head of which coöperates with the notches 48 and 49 in the bottom edge of the bar 45. From this construction it will be seen that when the bar 45 is in its extreme forward position, shown in Fig. 4, and the post 47 is seated in the notch 49, the trimmer-blade is rigidly held in operative position and by the rotation of the eccentric 27 and the actuation of the strap 26 thereby, the trimmer-blade will be caused to trim the work. When, however, the bar 45 is thrown to the opposite extreme,—as by lifting the same and bringing the notch 48 into coöperation with the post 47,—the trimmer-holder will be depressed in the socket 32 of the eccentric strap 36 and the trimmer-blade will be thrown out of operation or operative position and this without affecting the operation of the machine or modifying the action thereof in any particular or any of the usual operating parts.

The trimmer is formed as usual with the beveled side inclined cutting-edge 50 and the finger 51 which guides the blade into proper coöperative and functional relation with a member 52 operating as a ledger-blade secured to the side of the presser-foot shank 17, as shown in detail in Fig. 7. In this figure the shank of the foot is provided with a transverse bore in which is set a sleeve 53 held in place by the screw 54 passing through the top of the foot shank and engaging said sleeve. The sleeve has secured to its forward end a head 55 which is longitudinally slotted and grooved for the reception of the ledger-blade 52. A set-screw 56 screws into and through the sleeve 53 and has its forward end engaging the back of the ledger-blade so as to press the latter forward into binding engagement with the opposite members 57 forming the front wall of the head 55. Thus, the ledger-blade can be adjusted and removed and can be set into proper coöperation with the trimmer-blade 34.

Instead of relying upon gravity to hold the adjustment given the bar 45, a bowed-spring 57 is fixed to the post 47 with its ends extending upwardly and having said ends slightly over-turned so as to coöperate with pins 58 projecting from the side of the bar 45. Thus, when either of the notches is set in coöperation with the post 47 the spring will hold the adjustment as an aid to gravity; and when the bar is lifted it is against the normal tension of the spring to hold the bar 45 down.

From the above description a detailed statement of the operation of the machine will not be necessary, it being obvious that if the trimming and sewing are to be begun simultaneously, the trimming mechanism will be thrown into the position of Fig. 4; and that when the point in the work has been reached where trimming is no longer necessary, the bar 45, will be lifted, quickly thrown backwardly and then depressed so that the post will coöperate with the notch 48, and the trimmer will be instantly thrown out of action without interfering with the stitching operation.

Frequently in taping coats it is necessary to cut the tape at the end of the operation and the operator usually stops the machine and uses a pair of scissors. This is not necessary with my trimming mechanism since when it is desired to cut the tape the trimmer-blade 34 can be thrown into operation, as described, if it is not already in operation and the tape turned in the path of movement thereof, thus quickly cutting the tape at the point desired. Ordinarily, the application of the tape and the trimming of the material proceeds simultaneously; hence, when it is desired to cut the tape the trimmer is in action, and may be continued in action or instantly thereafter thrown out of action.

Having thus described my invention what I claim and desire to secure by Letters Patent is:

1. A trimming mechanism for sewing machines comprising a trimmer-holder located below the work-plate of the machine and carrying a trimmer-blade; a means for supporting and also for actuating the holder also located below the work-plate; and means connected to the supporting and actuating means for moving the holder independently of the latter means.

2. A trimming mechanism for sewing machines comprising a trimmer-holder carrying a trimmer-blade; a means for supporting and also for actuating the holder; and means for actuating the holder independently of its supporting and actuating means, including a rock-shaft, manual means for actuating the shaft, and a link connected to the shaft and holder.

3. A trimming mechanism for sewing machines comprising a trimmer-holder carrying a trimmer-blade; a means for supporting and also for actuating the holder; a lever carried by the said means; a connection between the lever and holder whereby the latter may be shifted independently of its support; and means for actuating the lever.

4. A trimming mechanism for sewing machines comprising a trimmer-holder, a constantly vibrating member in which said holder may slide, a lever pivotally supported on said member, an operative connection between said holder and lever, and means whereby the lever may be actuated to control the position of the holder regardless of the action of said member.

5. A trimming machine comprising a trimmer-holder, a constantly vibrating member for actuating said holder, a lever pivoted for movement relatively to said member, a connection between said lever and said holder, means whereby the lever may be manipulated to control the action of the holder without disturbing the action of the vibrating member, all said parts being arranged and operating below the work-plate of the machine, a trimmer secured in said holder, whereby the trimmer may be depressed below the work-plate out of operative position, and a member operating as a ledger blade for coöperating with said trimmer.

6. A trimming mechanism comprising a trimmer-holder, a member for supporting the holder and relatively to which the holder may reciprocate, a lever carried by the member and operatively connected to the holder, means for actuating the member to operate the holder and independent means for actuating the lever to control the operation of the holder.

7. A trimming machine comprising a reciprocating trimmer-blade arranged below the work-plate, a member operating as a ledger-blade for coöperating with said trimmer blade and arranged above the work-plate, means for adjustably supporting the ledger-blade, means for adjustably supporting the trimmer-blade, and means for throwing the trimmer-blade into and out of coöperative relation with the ledger-blade at the will of the operator.

8. A trimming mechanism comprising a trimmer-holder and means for controlling the same, the latter comprising a rock-shaft, a vibratory lever and a hand manipulating bar, a connection between the rock-shaft and the lever, a connection between the lever and the holder, and a connection between the rock-shaft and the bar.

9. A trimming mechanism comprising a trimmer-holder, means for actuating the same, and means for controlling the position of the holder including a vibratory lever, a rock-shaft, an arm and link connections between the shaft and lever, a sliding connection between the lever and the holder, and means for rocking the shaft.

In testimony whereof I have hereunto signed my name in the presence of two subscribing witnesses.

JOHN P. WEIS.

Witnesses:
WILLIAM Y. SWENARTON,
EDWARD L. RUSSELL.

Copies of this patent may be obtained for five cents each, by addressing the "Commissioner of Patents, Washington, D. C."